July 16, 1968  J. MEYER ETAL  3,393,268
INSULATED ELECTRICAL CONDUCTORS AND METHOD FOR PRODUCING SAME
Filed Jan. 9, 1964

INVENTORS
JEAN MEYER
ROGER BONVALLET
ANGELO FASANI

ATTORNEYS

3,393,268
INSULATED ELECTRICAL CONDUCTORS AND METHOD FOR PRODUCING SAME
Jean Meyer, Basel, Switzerland, Roger Bonvallet, Saint-Louis, France, and Angelo Fasani, Basel, Switzerland, assignors to Etablissements Emile Haefely S.A., Saint-Louis, France, a French company
Filed Jan. 9, 1964, Ser. No. 336,669
Claims priority, application Austria, Jan. 21, 1963,
A 221/63
20 Claims. (Cl. 174—120)

ABSTRACT OF THE DISCLOSURE

This invention relates to a method of insulating an electrical conductor or conductor bundle in which composite layers of insulating material are wound around said conductor or bundle, each layer consisting of insulating tape wound in an overlapping spiral and a reinforcing tape impregnated with a thermosetting resin wound in an open spiral and in which the resin impregnated tape is cured after each composite layer is formed and in which the insulated conductor is finally dried, evacuated, and impregnated with a thermosetting resin.

---

This invention relates to the insulation of high voltage conductor bars, windings or coils of electrical machines, and more especially to a method of manufacturing a high voltage insulation of the resin impregnated type.

In recent years the synthetic resins of the polyester and epoxy type have brought considerable improvements in the art of impregnating the insulation of conductor bars, windings and coils of electrical machines. Their main quality is to harden (polymerise) without producing volatile components.

At present two different methods of producing resin impregnated insulation on conductors are in general use. In one method all the non-impregnated insulation required is applied to the conductor in layers and is afterwards impregnated with the synthetic resin. In the second method the insulating material is first pre-impregnated with the resin before being applied in layers to build up the requisite insulation. Using either method it is extremely difficult to produce a safe and satisfactory insulation free of gaps between layers and open voids, and in high-voltage insulation it is important that these should be avoided.

The problems in obtaining satisfactorily impregnated insulation of this kind reduce with decreasing viscosity of the impregnating resin and the compactness with which the layers of material to be impregnated lies together. However, all the appropriate resins are rather viscous at ambient temperature, their viscosity during impregnating lying between the order of 100 and 300 cps. It is possible to reduce the viscosity by using higher impregnation temperatures, but the increased temperature accelerates the hardening process as a result of which the success of the impregnation is uncertain and voids and gaps in the finished insulation tend to appear.

It is most important that the layers of insulating material should lie compactly together before and during impregnation, since spaces or gaps between them cannot be filled by the impregnating resin. In this connection it is particularly difficult to form the layers to lie with the required degree of compactness, when producing high-voltage resin impregnated insulation, which is consequently thick, and when the conductor to be insulated is long. In one method of attempting this, the component to be insulated has been subjected to the action of a press both during impregnation and hardening. Since a vacuum treatment usually precedes impregnation, which itself must be effected in a vacuum, complicated press moulds are necessary, for example, for use in impregnating different sizes of coils or windings being insulated.

One of our objects in the present invention is to provide a new or improved method of impregnating the insulation of electrical conductors such as, for example, the windings or coils of electrical machines, with a synthetic resin.

Another object is to provide a new or improved method of impregnating insulations of this kind with a synthetic resin, wherein relatively viscous resin can be used without necessitating the use of special and complicated press moulds.

A further object is to provide a new or improved method of producing an electrical insulation on a conductor or group of conductors, using a synthetic resin impregnant for an insulating material, wherein dimensional disadvantages resulting from the impregnation and hardening process of the resin are avoided.

A further object is to provide a new or improved compact high-voltage insulation for conductors, impregnated by a synthetic resin, wherein spaces and gaps in the insulation are avoided.

The present invention consists in a method of insulating an electrical conductor or conductor bundle in which insulating material is applied to the conductor or bundle in layers formed one upon the next that are impregnated with a synthetic resin to complete the insulation, in which method the layers each compositely consist of parts which are pre-impregnated with a synthetic resin in a viscous state and hardened immediately after application and parts which are impregnated with a synthetic resin in a viscous state and hardened after formation of the total number of layers.

The invention also consists in a method of applying electrical insulation to conductors or conductor bundles, such as coils, windings or cables, and which may be additional to any basic electrical insulation of separating one conductor from another, which method includes the steps of forming an insulating tape layer by spirally winding electrically-insulating tape around the conductor or group with the convolutions thereof overlapping to form a continuous insulating layer, binding the insulating tape layer with a reinforcing tape that is pre-impregnated with a synthetic resin in a viscous state, said reinforcing tape being wound along and around the conductor or conductor group as an open spiral, hardening said synthetic resin, and finally completing the insulation by impregnating the whole with a synthetic resin in a viscous state and hardening the synthetic resin.

The invention further consists in a method of applying electrical insulation to conductors or conductor groups, such as coils, windings, cables or conductor bundles, using electrically-insulating tape wound spirally around and along the conductor or conductor group and which may be additional to any basic insulation separating one conductor from another, which method includes the steps of forming a plurality of reinforced insulating tape layers one upon the next, each said reinforced layer consisting of a first spiral winding of electrically-insulating tape the convolutions of which overlap to form a continuous insulating layer and which is not pre-impregnated with a synthetic resin and a second and open spiral winding of reinforcing tape wound upon the first tape winding, said reinforcing winding being preimpregnated with a synthetic resin in a viscous state and hardened prior to the application of tape to form the next following layer, and finally completing the insulation after hardening the synthetic resin of the outermost reinforced insulating layer, by impregnating the whole with synthetic resin in a viscous state and hardening the synthetic resin.

One method of performing the invention will now be described in more detail, by way of example, with reference to the accompanying drawings, in which.

Figure 1:
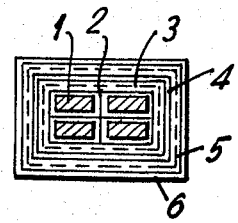
FIGURE 1 is a sectional view of a conductor bundle insulated according to the method of this invention.

Referring now to the drawings, 1 denotes a conductor bundle made up of four conductors individually insulated against each other basically in a usual manner, which does not form part of the invention, by a tape insulation 2. This conductor bundle 1 is surrounded by a porous and, for example, micaceous insulating tape 3, which at this stage and in accordance with the invention is not impregnated with a synthetic resin. This tape is wound in an overlapping spiral in order to make up a first insulating layer. Around this first insulating layer a reinforcing tape 4 is wound as an open spiral. This reinforcing tape 4 is made of an insulating material with high tensile strength and is pre-impregnated with a synthetic resin in a viscous state shrinking by about 3% or more when hardening.

The reinforcing tape 4 is preferably 0.2 to 0.3 mm. thick and is a fibre glass tape with longitudinal fibres. It can be pre-impregnated with the identical resin to that which will be used for impregnating the complete insulation at a later stage in accordance with the invention. If the resin of the reinforcing tape is different from the resin to be used in the final impregnation, special care in their selection is required so that they chemically and physically agree after hardening. The reinforcing tape 4 is hardened after its application. Due to the shrinking of the resin, it surrounds the insulation layer 2 as a close and rigid armour. Instead of using a shrinking reinforcing tape, a tape which shrinks very little or not at all may be used if it is tightly wound. The hardening of the reinforcing tape may be effected in a simple press in order to regulate the dimensions.

Figure 2:
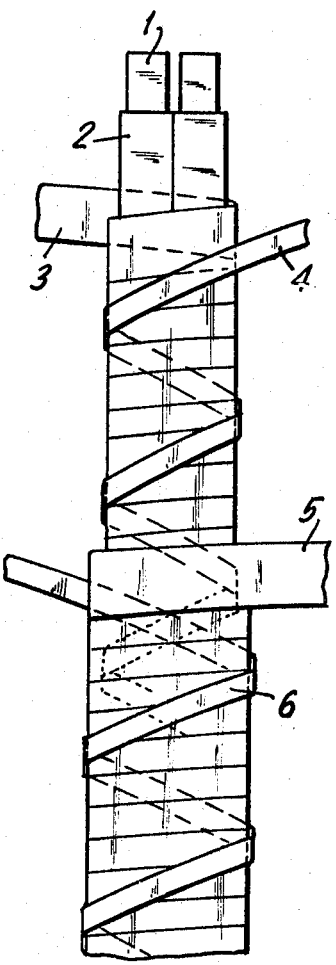
FIGURE 2 is a longitudinal view of a similar conductor bundle and shows the insulation partly unwound.

A second insulating layer is applied over the hardened reinforcing tape 4 in a similar way as for the first layer 3 by winding a porous, unimpregnated insulating tape 5 in an overlapping spiral, as shown in FIGURE 2. This second insulating layer may be thicker than the first one either by using a thicker insulating tape or by applying several tapes superimposed one upon each other or by increasing the amount of convolution overlap. The thickness of the insulating layer can be increased with decreasing viscosity of the impregnating resin. The resins which are available at present lead to a practical thickness of 1 mm. for the second insulating layer. The first insulating layer, however, is advantageously as thin as possible to prevent spaces forming between the layers 2 and 3, especially in case of smooth conductors.

Around the second insulating layer 5 a reinforcing tape 6 pre-impregnated with synthetic resin in a viscous state is wound in a similar manner as for tape 4. Moreover, care is taken that the tape 6 lies in the intervals of the spiral of the first reinforcing winding as described with reference to the tape 4.

When a thicker overall insulation is required, it is built up step-by-step by applying alternate insulating layers and reinforcing tapes. The insulating layers may all have the same thickness and be thicker than the first layer. To accelerate the insulating process, especially when producing thick insulations for high voltages, it is preferable to increase the thickness of each successive insulating layer with the progressive increases in the overall diameter of the insulation formed.

The complete insulation, built up as described above, is finally dried, evacuated, impregnated with a synthetic resin and hardened. However, this procedure is considerably easier since with the insulation built up in accordance with the invention by alternate nonimpregnated and pre-impregnated layers no moulds or presses are required for this final stage. Due to the action of the pre-impregnated reinforcing tapes a compact insulating body is moulded, exactly as required for impregnation by relatively viscous resins, and makes it possible to use resins of 200 to 300 cps. successfully and safely.

Another important advantage provided by the present invention is the fact that the coil or winding is fixed in a rigid armour before final impregnating and does not alter by shrinking of the hardening resin. Therefore it is possible to apply the exact insulation thickness required without disappointment after final impregnation.

What we claim as our invention and desire to secure by Letters Patent of the United States is:

1. An insulated electrical conductor in which the electrical insulation includes layers each composed of electrically insulating tape spirally wound about the conductor with convolutions thereof overlapping one upon the next, each said insulating layer being bound with a reinforcing tape of material impregnated with a synthetic resin and formed as an open spiral, wherein the convolutions of each reinforcement winding after that surrounding the first insulating layer lie opposite the spaces between the convolutions of the preceding reinforcement winding, and wherein the complete insulation is impregnated with a thermosetting synthetic resin.

2. A process for the production of electrical insulation on electrical conductors or conductive components which process consists of applying a plurality of layers of electrically insulating tape each layer in the form of a spiral winding of the tape around the conductor with the convolutions of the tape overlapping one upon the next, binding each said insulating layer with a reinforcing winding formed by a tape wound as an open spiral and pre-impregnated with a thermosetting synthetic resin in a viscous state, hardening said synthetic resin upon completing each reinforcement winding, and thereafter drying, evacuating and impregnating the whole assembly with a synthetic resin in a viscous state and hardening said synthetic resin to complete the insulation.

3. A process as claimed in claim 2, wherein said electrically insulating tape is porous and micaceous.

4. A process as claimed in claim 2, wherein the synthetic resin used to impregnate the reinforcing tape is one which leads to a shrinkage factor of 3% or more in the tape upon hardening.

5. A process as claimed in claim 2, wherein the hardening of the synthetic resin impregnating each reinforcing winding is effected in a press.

6. A process as claimed in claim 2, wherein the first insulating layer is thinner than the succeeding formed insulating layers.

7. A process as claimed in claim 6, wherein the first insulating layer consists of a single tape winding, and wherein subsequent insulating layers consists of a plurality of superpositioned tapes wound in unison.

8. A process as claimed in claim 6, wherein said succeeding insulating layers are all of the same thickness.

9. A process as claimed in claim 2, wherein the synthetic resin used for impregnating the whole assembly has a viscosity of between 200 and 300 cps.

10. A process as claimed in claim 2, wherein the impregnating resin of the reinforcing tapes is chemically and physically consistent with the impregnating resin used for the whole.

11. A process as claimed in claim 2, wherein identical synthetic resins are used both for impregnating the reinforcing tapes and the whole assembly.

12. A process for the production of insulation on electrical conductors or conductive components, comprising the steps of spirally winding an electrically insulating tape around the conductor or component with the convolutions thereof overlapping and forming a first electrically insulating layer, winding a tape that is pre-impregnated with a thermosetting synthetic resin in a viscous state as an open spiral on said first insulating layer and then hardening said synthetic resin forming a reinforcement, spirally winding a second electrically insulating tape around said first insulating layer and reinforcement with the convolutions thereof overlapping and forming a further electrically insulating layer, forming a second reinforcing layer similarly to the first on said further insulating layer, and finally drying, evacuating and impregnating the whole with a synthetic resin in a viscous state and hardening said synthetic resin to complete said electrical insulation.

13. A process as claimed in claim 12, wherein the electrically insulating tape is porous and micaceous, wherein the reinforcement tape is a fibre-glass tape of high tensile strength having the fibres extending in the longitudinal direction thereof, wherein the synhetic resin leads to a shrinkage factor of 3% or more in the reinforcing tape when hardened, and wherein the viscosity of the synthetic resin used for impregnating the whole assembly is between 200 and 300 cps.

14. A process for the production of electrical insulation on electrical conductors or conductive components, comprising the steps of spirally winding an electrically insulating tape around the conductor or component with the convolutions thereof overlapping and forming a first electrically insulating layer, winding a tape that is pre-impregnated with a thermosetting synthetic resin in a viscous state as an open spiral on said first insulating layer and then hardening said synthetic resin thereby forming a reinforcement, similarly applying subsequent windings of electrically insulating tape and said pre-impregnated tape forming alternate insulating layers and reinforcement layers, and finally drying, evacuating and impregnating the whole with a synthetic resin in a viscous state and hardening said synthetic resin to complete said electrical insulation.

15. A process as claimed in claim 14, wherein the convolutions of the tape windings forming reinforcing layers after the first are wound to lie over the spaces of the precedingly wound reinforcement layer.

16. A process as claimed in claim 14, wherein the thickness of the individual insulating layers is progressively increased whereby each insulating layer applied is thicker than the precedingly applied insulating layer.

17. A process for the production of electrical insulation on electrical conductors or conductive components, comprising the steps of spirally winding an electrically insulating tape around the conductor or component with the convolutions thereof overlapping and forming a first electrically insulating layer, winding a tape that is pre-impregnated with a thermosetting synthetic resin in a viscous state as an open spiral on said first insulating layer and then hardening said synthetic resin thereby forming a reinforcement, spirally winding a second electrically insulating tape around said first insulating layer and reinforcement with the convolutions thereof overlapping and forming a second insulating layer, increasing the thickness of the said insulation by the addition of similar further windings in which a reinforcement winding is wound upon each precedingly wound insulating winding and said resin is hardened prior to the winding of the succeeding insulating layer, and completing the insulation with a reinforcement winding and after hardening the synthetic resin thereof drying, evacuating and impregnating the whole with a synthetic resin in a viscous state and hardening said synthetic resin.

18. A process as claimed in claim 17, wherein the reinforcement tape is a tape of high tensile strength.

19. A process as claimed in claim 18, wherein the reinforcing tape is a fibre-glass tape having the fibres extending longitudinally thereof.

20. A process as claimed in claim 19, wherein the said fibre-glass tape has a thickness of between 0.2 to 0.3 mm. thick.

References Cited
UNITED STATES PATENTS 2,479,357    8/1949    Hill et al. _____ 156—190 X
3,137,120    6/1964    Budenbender _____ 156—54 X EARL M. BERGERT, *Primary Examiner.*

T. R. SAVOIE, *Assistant Examiner.*